United States Patent [19]

Cutler, Jr. et al.

[11] Patent Number: 5,467,345
[45] Date of Patent: Nov. 14, 1995

[54] PACKET ROUTING SYSTEM AND METHOD THEREFOR

[75] Inventors: Victor H. Cutler, Jr., Mesa; Peter Richetta, Tempe, both of Ariz.; Kenneth P. Young, Columbia; Gerald J. Davieau, Eldersburg, both of Md.

[73] Assignee: Motorola, Inc., Schaumburg, Ill.

[21] Appl. No.: 251,459

[22] Filed: May 31, 1994

[51] Int. Cl.$^6$ ..................................................... H04J 3/24
[52] U.S. Cl. ......................................... 370/60; 370/94.1
[58] Field of Search ................................. 370/60, 57, 24, 370/95.3, 97, 94.3, 94.1, 94.2, 29, 30, 33, 16, 75, 76, 95.1, 104.1

[56] References Cited

U.S. PATENT DOCUMENTS 4,974,224  11/1990  Boone ..................................... 370/94.1
5,128,926  7/1992  Perlman et al. ......................... 370/94.1

*Primary Examiner*—Douglas W. Olms
*Assistant Examiner*—Ricky Ngo
*Attorney, Agent, or Firm*—Gregory J. Gorrie

[57] ABSTRACT

Information packets are routed among a constellation of satellite nodes in a communication system in a distributed, yet systematic fashion. Routing tables for each node are generated in advance by a recursive process that considers link usage and anticipated link loading for different times and states of the constellation. Routing tables are generated centrally, distributed to, and maintained in each satellite node. The routing tables are updated regularly to reflect anticipated traffic loading and physical changes in node connectivity within the constellation which occur as a result of satellite motion. The tables are also updated responsively to reflect changes in network connectivity which occur because of failures that may occur in the cross-links or satellite nodes.

22 Claims, 5 Drawing Sheets

PACKET ROUTING SYSTEM AND METHOD THEREFOR

CROSS-REFERENCE TO RELATED APPLICATIONS

This application is related to U.S. patent application Ser. No. 08/222,067, filed on Apr. 4, 1994, entitled "METHOD AND APPARATUS FOR ADAPTIVE DIRECTED ROUTE RANDOMIZATION AND DISTRIBUTION IN A RICHLY CONNECTED COMMUNICATION NETWORK" which is assigned to the same assignee as the present application, now U.S. Pat. No. 5,430,729.

TECHNICAL FIELD OF THE INVENTION

The present invention relates generally to communication systems. More specifically, the present invention relates to systems that route packets of information between nodes in a communication system.

BACKGROUND OF THE INVENTION

Communication systems or networks, such as those used to deliver telecommunications, to deliver video images, to interconnect computers, to provide conventional cellular communications, and the like, may include any number of nodes. These networks may deliver electronic communications between two points by routing the communications content from node to node within the network. As the number of nodes in a network increases and as the number of communication paths available to each network node increases, the number of potential paths available for delivering any single communication likewise increases. As the number of potential paths which are available increases, a problem of selecting an appropriate path through the network arises. Typically, it is advantageous for the network to attempt to select the shortest possible path to minimize delay, to consume a minimal amount of network resources, and to maximize reliability in delivering communications, information flow, or other service. At the same time, actions within the network need to balance the constraints of the delay, resource consumption, and reliability with the need to prevent overloading any of the network nodes or communication links, while maintaining delivery of the network traffic. Delivery of network traffic to its intended destination is desirably made with proper allowances for statistical variations in traffic and an ability for the network to absorb instantaneous changes in requested service without having to react to the volume of traffic by devising new routing instructions.

In a global communication system where nodes are space based, simplicity and robustness are key ingredients in implementing a practical and operationally useful routing scheme. In addition, the nodes of such a system may move with respect to one another, thereby introducing variations in both link capacity and demand which should be accounted for naturally and simply in the methodology. Furthermore, minimal exchange in the network is desirable in order to minimize node copy complexity and simplify route management. Minimal exchange of any route information also results in increased reliability and reduced cost.

Routing in dynamic or moving systems or networks, has generally required near real time exchange of routing update information among the network nodes. Significant nodal decision making processing has also been common within the nodes. While both real time update and significant nodal decision making are possible, a simpler technique is desirable from simplicity, cost, and increased reliability standpoints. In addition inter-satellite propagation delays which are longer than their terrestrial counterpart exacerbate the difficulties of properly synchronizing the nodal decision making to update routing decisions with the most current information and to then develop the best routing instructions or decisions.

There are a number of alternative methodologies that may be applied to the task of determining routing within a moving and dynamic communication system. The first is centralized where updated routes are calculated in a centralized location and the information is either transmitted to each node in the form of a table, or otherwise distributed to each call processing entity and used therein to select the optimum route at the time of a connections is to be established between the source and destination nodes. A form of this methodology is called source routing and has been implemented by some existing packet networks such as Tymnet. However, in ground based communication networks such as in Tymnet, all calls are normally processed by a single central supervisor which calculates and maintains the updated route information for each possible source-destination pair in the network. Since that single resource selects routes for each communication and assigns so-called "virtual circuit" identifiers to each, the uniqueness of such route identification is maintained for all communication needs throughout the network, and no confusion is created when several communications cross simultaneously through one intermediate node on their journey through the network.

The situation is quite different in a global satellite based communication network where both the space-borne nodes and the terrestrial interconnect points share the communication processing load and may share in the generation and attachment of connection identification as part of the inter nodal transmissions. If used, then careful attention is needed to keep track of the virtual circuit identifiers assigned to in real-time by the processing nodes so that the same virtual circuit is not re-used by another node in identifying a route for a new connection. The complexity and inefficiency associated with real-time exchange of route identification information among several remotely located nodes in a global satellite based communication network is both undesirable and unnecessarily expensive.

Thus what is needed is a method and apparatus of routing information packets among nodes in a communication system where the nodes are moving with respect to each other, and where the connections or links between the nodes are also changing as a function of the position of the node. What is also needed is a highly distributed routing method that is implemented autonomously by each node. What is also needed is a routing method which achieves uniformity in the usage of network links while limiting the number of hops between source and destination on each path used for routing. What is also needed is a routing method which uses the available resources, prevents link congestion and at the same time allows for the statistical variations which occur due to the random arrival and departure of users of the system.

SUMMARY OF THE INVENTION

Accordingly, it is an advantage of the present invention to provide a network with instructions which route communication signals in a distributed fashion.

Another advantage of the present invention is that network resources dedicated to routing communication signals are minimized.

Another advantage of the present invention is that routing decisions are made with the lowest cost means at the communication nodes.

Another advantage is that the present invention distributes routing of data packets among various communication links.

Another advantage is that the present invention minimizes delay in delivering communication signals between network entry and exit points.

Another advantage is that the present invention compensates for communication traffic variations.

Another advantage of the present invention is that it allows for updating of routing tables in communication nodes to reflect network failures and changing traffic demand patterns.

The above and other advantages of the present invention are carried out in a communication system comprised of nodes that communicate with each other over links. The invention provides a method of routing data packets among said nodes. The method comprises the steps of partitioning an anticipated system traffic load into traffic levels, each traffic level being a subset of said anticipated system traffic load, and generating a routing instruction set for each node for one of said traffic levels. The method further comprises the steps of determining if any of said links will be overloaded based on said routing instruction set, and re-generating, when said any of said links are determined to be overloaded, said routing instruction set for each node by excluding said links determined to be overloaded. The method further comprises the step of routing said data packets away from one of said nodes according to said routing instruction set for said one of said nodes.

In another embodiment, the invention provides a method of routing a data packet among nodes in a constellation of nodes coupled by links, said nodes being part of a communication system wherein said data packet includes a destination routing code that indicates a destination node for said data packet. The method comprises the steps of receiving said data packet at one of said nodes, and reading said destination routing code from said data packet. The method further comprises the steps of reading a connection identification (ID) from said data packet, and indexing a routing table stored in said one of said nodes based on said connection ID and said destination routing code. The method further comprises the steps of determining an exit link of said one node by reading said routing table and routing said data packet away from said one node over said exit link. The routing table is generated by the steps of partitioning an anticipated system traffic load of said communication system into traffic levels, each traffic level being a subset of said anticipated system traffic load, and the step of generating a routing instruction set for each node for one of said traffic levels. The routing table is also generated by the steps of determining if any of said links will be overloaded based on said routing instruction set, and re-generating, when said any of said links are determined to be overloaded, said routing instruction set for each node by excluding said links determined to be overloaded. The routing table is also generated by the steps of repeating the re-generating and determining steps until no links are determined to be overloaded, and repeating the generating step, the determining step and the re-generating step for each of said traffic levels. The routing table is generated for each of said nodes and comprises said routing instruction set for each of said traffic levels.

The invention also provides a communication system that routes a data packet. The system comprises a plurality of nodes that move with respect to each other, said nodes coupled by communication links, and transceivers associated with each node of said plurality for routing said data packet over said communication links. The system also comprises a memory for storing a routing table, a first processor for generating said routing table, and a second processor for reading said routing table and instructing said transceivers to send said data packet away from one of said nodes based on said routing table. The first processor comprises means for partitioning an anticipated system traffic load into traffic levels, each traffic level being a subset of said anticipated system traffic load. The first processor also comprises means for generating a routing instruction set for said one of said nodes for said traffic levels. The first processor also comprises means for determining if any of said communication links will be overloaded based on said routing instruction set. The first processor also comprises means for re-generating, when said any of said communication links are determined to be overloaded, said routing instruction set for said one of said nodes by excluding said communication links determined to be overloaded.

DETAILED DESCRIPTION OF THE DRAWINGS

A "satellite" is defined herein to mean a man-made object or vehicle intended to orbit a celestial body (e.g., Earth). The word Earth is intended to include any celestial body around which a communication satellite may orbit. A "constellation" is defined herein to mean an ensemble of satellites arranged in orbits for providing specified coverage (e.g., radio communication, photogrammetry, etc.) of portion(s) or all of a celestial body. A constellation typically includes multiple planes (or orbits) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The term "satellite" is intended to include both geostationary and orbiting satellites and/or combinations thereof including low earth orbiting (LEO) satellites.

Figure 1:
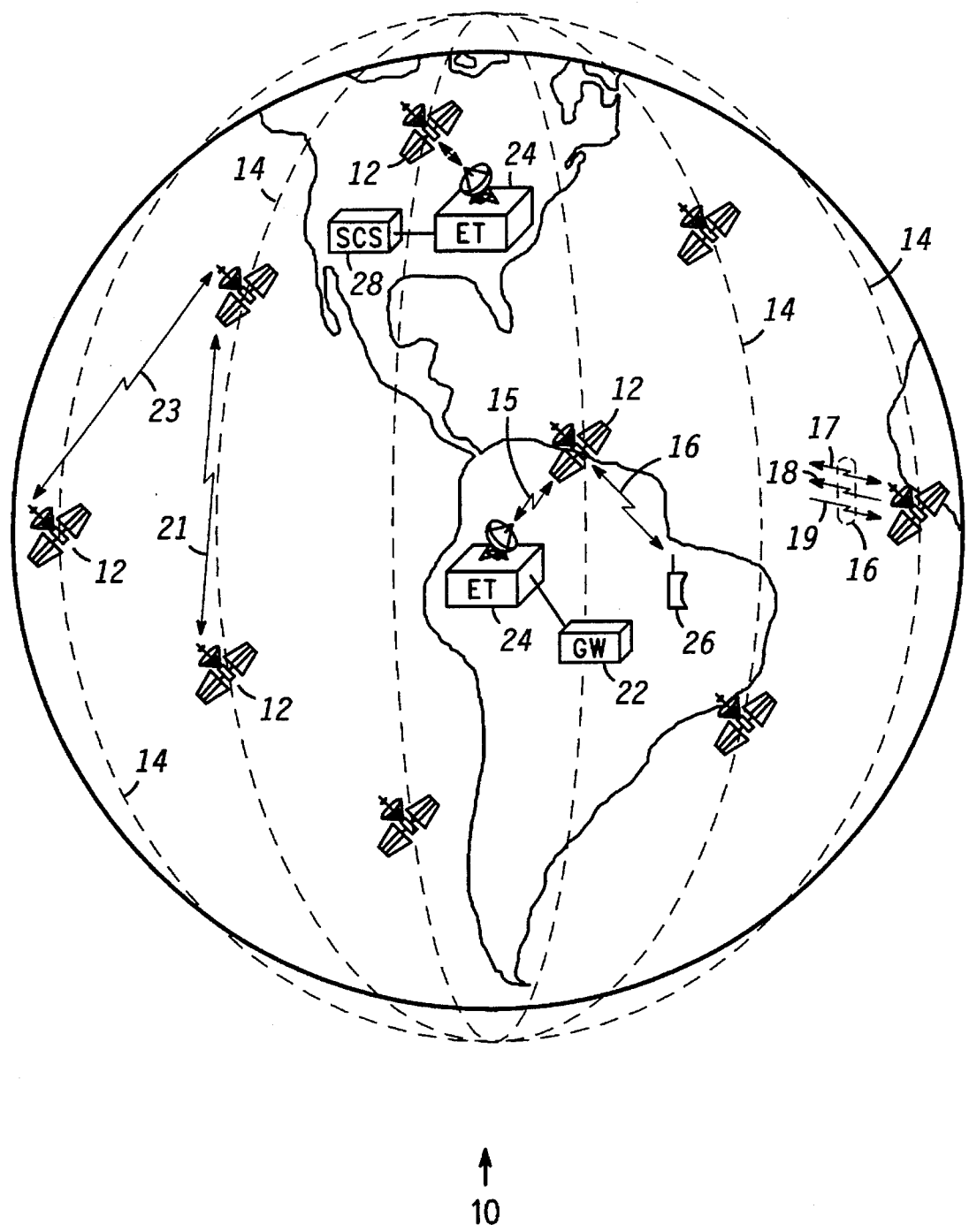
FIG. 1 illustrates a highly simplified diagram of a satellite based communication system of which the present invention may form a portion.

FIG. 1 illustrates a highly simplified diagram of satellite based communication system 10 of which the present invention may form a portion. Communication system 10 is shown dispersed over and surrounding a celestial body (e.g., Earth) through use of orbiting satellites 12 occupying orbits 14. The present invention is applicable to systems including satellites having low-Earth, medium-Earth and geo-synchronous orbits. Additionally, it is applicable to orbits having any angle of inclination (e.g., polar, equatorial or other orbital pattern).

Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, $Us 26 may be a hand-held, portable cellular telephones adapted to communicate with satellites 12. Ordinarily, SUs 26 need not perform any control functions for communication system 10.

Network 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support Real-Time communications. At least one traffic channel 17 is assigned for each call, and each traffic channel 17 has sufficient bandwidth to support, as a minimum, a two-way voice conversation. To support Real-Time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through in-plane cross-links 21 and cross-plane cross-links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

Figure 2:
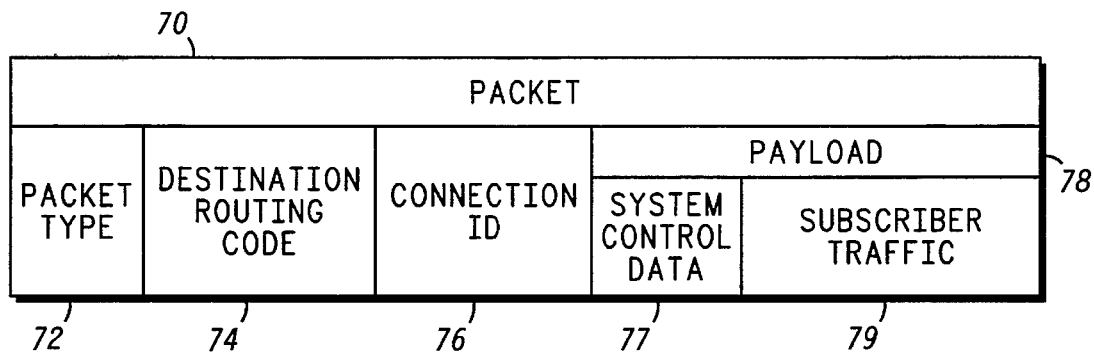
FIG. 2 illustrates an exemplary information packet used to transport communications suitable for use in a preferred embodiment of the present invention.

FIG. 2 shows a block diagram of exemplary data packet 70 that may be used to transport a communication to or from subscriber unit 26. Packet 70 includes header 72 which carries data identifying a type characterization to be associated with packet 70 and any other information conventionally included in data packet headers. The type characterization may indicate whether packet 70 exclusively conveys system control messages or whether it conveys subscriber traffic. Routing destination code 74 instructs system 10 (FIG. 1) where to deliver packet 70.

Connection ID 76 includes a code that uniquely is associated with subscriber unit 26 by the destination satellite 12 or ET 24 (FIG. 1). Destination satellites will provide a traffic channel 17 uniquely associated with the Connection ID 76. Destination satellite 12 uses Connection IDs 76 of packet 70 that carry subscriber unit traffic to route such packet payload subscriber traffic 79 to traffic channels 17 assigned to the identified subscriber unit 26.

Header 72, routing destination code 74, and Connection ID 76 represent overhead data which serve to get packet 70 to its destination and can be profitably used in routing packets through the network. At the packet's destination, payload data 78 are consumed. In other words, the purpose of sending packet 70 to a destination is typically to deliver payload data 78, not header 72, routing destination code 74, or Connection ID 76. Payload data 78 includes either system control data 77 or system control data together with subscriber traffic 79 (e.g., voice and/or data). System control data are commands or messages which are interpreted and acted upon by subscriber units 26. Subscriber traffic 79 represents subscriber data transported in the course of a call. As discussed above, a digitized version of an entire frame of conversational audio may be conveyed by subscriber traffic 79 as might a portion of subscriber provided data traffic such as might be provided by an output from a computer or properly interconnected modem.

Routing destination code 74 desirably includes a Call Sequence Number (CSN) or Logical Channel Number (LCN) to differentiate between various calls within a gateway or within the originating or terminating satellite. The CSN (LNC) may be used to map a packet to the assigned traffic channel 17 of the link between the satellite and the SU 26. The CSN (LCN) may also be included in other portions of packet 70. Routing destination code 74 may include a destination satellite number or other designator for the destination of the packet. The destination code 74 is desirably assigned within the system and known by all satellites 12 and ETs 24 participating in the process of connection establishment. By way of example the call control gateway maintains knowledge of the constellation motion, satellite 12 positions and the time dependent coverage zone of each satellite 12 as it moves. The destination satellite number is used by satellites 12 to route a packet to its destination satellite. At the destination satellite, the packet is transmitted on a downlink (i.e., subscriber traffic channel 17) to either a subscriber unit 26, or in the composite transmission of packets destined to a gateway 22.

Figure 3:
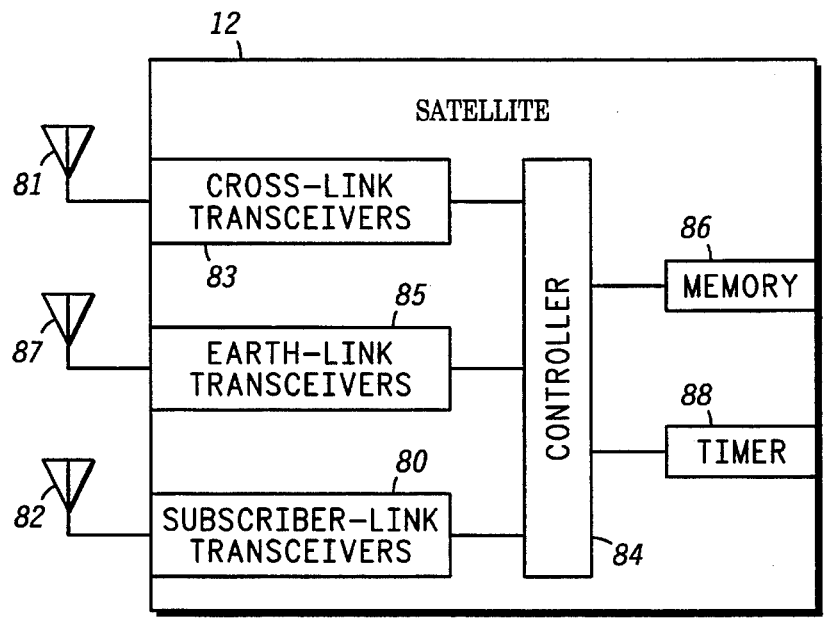
FIG. 3 illustrates a simplified block diagram of a satellite radio communication node suitable for use in a preferred embodiment of the present invention.

FIG. 3 illustrates a simplified block diagram of a satellite radio communication node suitable for use in a preferred embodiment of the present invention. Satellite node 26 is provided by a satellite 12. Preferably, all satellites 12 within system 10 (see FIG. 1) include equipment as illustrated by the block diagram of FIG. 3. Satellite 12 includes cross-link transceivers 83 and associated antennas. Transceivers 83 and antennas 81 support cross-links to other nearby satellites 12. Earth-link transceivers 85 and associated antennas 87 support earth-links to communicate with earth terminals 24 (FIG. 1). Moreover, subscriber unit transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 81, 87, and 82 may be implemented either as single multi-directional antennas or as banks of discrete antennas. It is desirable that subscriber unit antenna be a phased array antenna capable of generating many cells 34 (FIG. 1) simultaneously.

A controller 84 couples to each of transceivers 83, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12.

Figure 4:
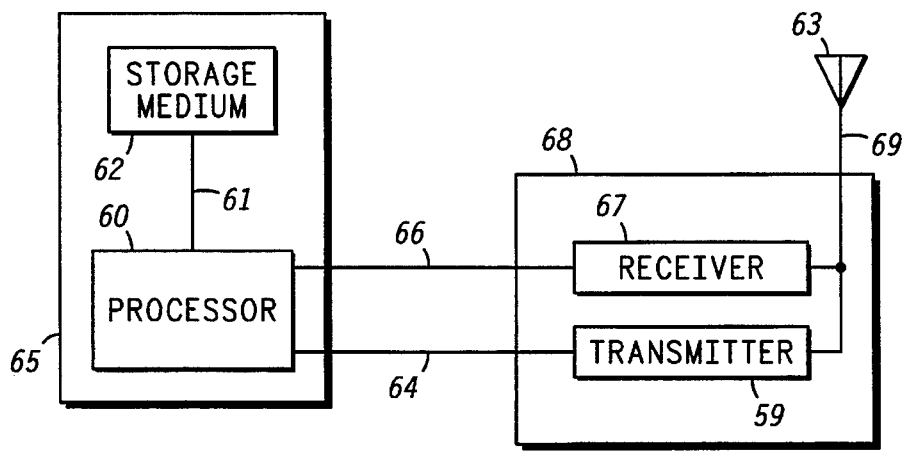
FIG. 4 illustrates a simplified block diagram of a portion of a system control station and an earth terminal suitable for use in a preferred embodiment of the present invention.

FIG. 4 illustrates a simplified block diagram of a portion of control station 65 and earth terminal 68 suitable for use in a preferred embodiment of the present invention. Control station 65 and terrestrial station 68 are desirably part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 63 coupled to transmitter 59 and receiver 67 via link 69. Transmitter 65 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 65 and/or receiver 67 transmit messages to and/or receive messages from satellites 12.

Conventional cellular radio units and systems are described for example in U.S. Pat. Nos. 4,783,779, 4,144, 412, and 5,097,499 and satellite communication systems are described for example in U.S. Pat. Nos. 4,722,083 and 4,819,227. These patents are herewith incorporated by reference. Subscriber unit antennas 82 (FIG. 4), subscriber unit transceivers 80 (FIG. 4), control station 28 (FIG. 1) and earth terminal 24 (FIG. 1) perform those functions and contain at least those equipment conventionally associated with switched terrestrial or satellite cellular communication systems, plus additional functions and equipment explained in more detail below.

Processor 60 generally controls and manages user access, message reception and transmission, channel set-up, radio tuning, frequency and time slot assignment, and other cellular radio communication and control functions not managed or provided for by controller 84 (FIG. 4). Among other things, processor 60 and/or controller 84 (FIG. 4) desirably executes procedures to allow user access to communication system 10.

In a preferred embodiment of the present invention, communication system 10 (FIG. 1) comprises 66 LEO satellites arranged in 6 orbits each containing eleven satellites 12. In reference to FIG. 1, each satellite 12 is coupled to two other satellites 12 within the same orbit 14 or orbital plane by in-plane cross-links 21. The capacities of in-plane cross-links 21 remain constant. Link capacity includes data carrying capacity. In a preferred embodiment, the cross-link capacity ranges from 100 to 200 packets for each frame time and is preferably about 140 packets per 9 milliseconds frame time. The capacities of cross-plane cross-links 23 (e.g., left and right cross-links) on the other hand vary from a maximum value when the satellites are about 4000 km apart to a minimum value when the satellites are about or 2700 km apart the cross-plane links 23 are shut down. For example, referring to FIG. 1, satellites 12 in different orbits 14 are furthest apart when near the equator, come closer together and reach about 4050 km when the satellite nearest the equator is at about 25 degrees latitude, and are relatively close together near the poles. In a preferred embodiment, cross-plane cross-links 23 are shut down as part of a power management process when the link capacity becomes small.

Also, in the preferred embodiment of FIG. 1, there are no cross-plane cross-links 23 at the seam which occurs between orbits on the opposite sides of the earth where satellites 12 are moving in opposite direction to each other. At the seam, the movement of satellites causes Doppler shifts too large for proper RF communication. As the earth completes a full rotation in 24 hours, the seam sweeps across the surface the earth and twice every 24 hours the effects of the seam are experienced.

As each satellite 12 moves through its orbits, cross-plane cross-links 23 between two satellites in neighboring orbits varies in capacity from a maximum near the equator to zero when the link are turned off. In a preferred cross-link embodiment down occurs when the satellite of an east-west pair which is most distant from the equator is at an angle of around sixty-eight degrees of latitude from the equator. Cross-plane cross-links 23 remain off until the associated satellite crosses a pole and are turned back on when this satellite 12 is at approximately a latitude of 52 degrees where the cross-link again has some capacity. The same cycle occurs as a satellite approaches the other pole. Moreover, as two cross-plane connected satellites travel over a pole, they switch sides in the sense of the left and right neighboring node connections. Because of these changes in the east-west cross-link capacity, a time variation in the relative node connectivity and topology occurs as the constellation moves around the earth.

Figures 5, 7:
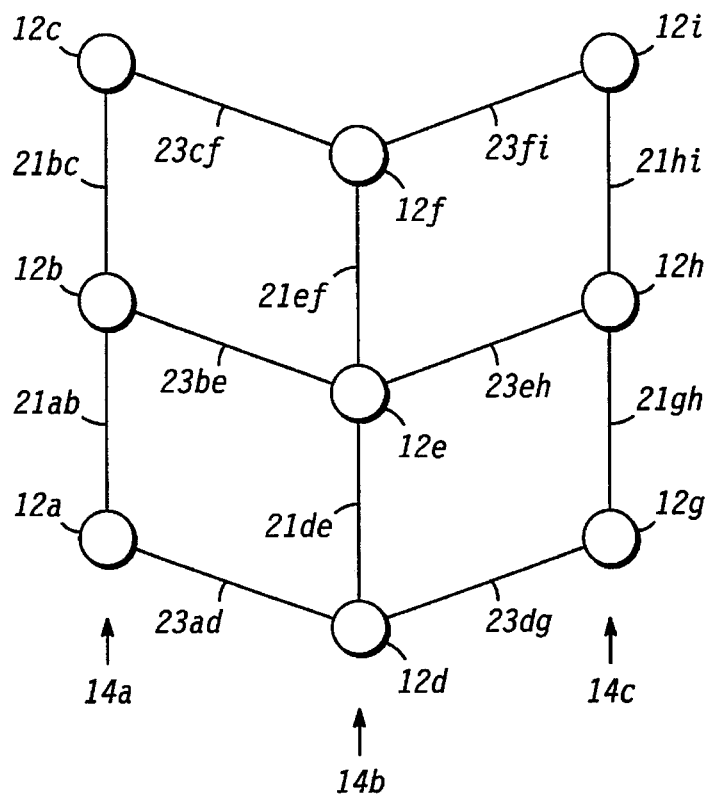
FIG. 5 illustrates a small portion of a constellation of satellite nodes connected by communication links.
FIG. 7 shows a representation of a routing table suitable for use in a preferred embodiment of the present invention.

FIG. 5 illustrates a small portion of a constellation of satellite nodes connected by communication links. FIG. 5 shows three sequential nodes in each of three adjacent orbits. Satellite nodes 12*a*, 12*b* and 12*c* are in orbital plane 14*a*, satellite nodes 12*d*, 12*e* and 12*f* are in orbital plane 14*b*, and satellite nodes 12*g*, 12*h* and 12*i* are in orbital plane 14*c*. Satellite nodes are connected with in-plane cross-links 21*ab*, 21*bc*, 21*de*, 21*ef*, 21*gh* and 21*hi*. Satellite nodes are also connected with cross-plane cross-links 23*ad*, 23*be*, 23*cf*, 23*dg*, 23*eh*, and 23*fi*. In a preferred embodiment of the present invention, many more nodes are similarly connected.

By referring to FIG. 5, there are two equivalent minimal hop paths for routing a data packet from node 12*d* to node 12*i*. One minimum hop path would use in-plane crosslink 21*de*, satellite node 12*e*, cross-plane cross-link 23*eh*, satellite node 12*h* and in-plane cross-link 21*hi*. The other minimum hop path between satellite nodes 12*d* and 12*i* would use cross-plane cross-link 23*dg*, satellite node 12*g*, in-plane cross-link 21*gh*, satellite node 12*h* and in-plane cross-link 21*hi*. Both of these alternate minimum hop paths utilize one cross-plane cross-links. If the cross-plane cross-links 23*eh* and 23*dg* are of equal capacity and not in use to service other traffic, both routes are equally desirable because they require the same number of hops. However due to the orbital motion of the nodes, cross-plane cross-links change traffic carrying capacity as a function of the distance between the nodes. Therefore, the capacity of one cross-plane cross-link may be less that the other cross-plane cross-link and the route that utilizes the cross-plane cross-link with a lower traffic carrying capacity is less desirable. Depending on the orbital position of the node, a cross-plane cross-link may be turned off, and another route must be utilized. Routing instructions for routing a data packet (i.e., how to depart the present node to reach any other destination node) are desirably stored within the nodes. These instructions preferably have regular and predictable time updating to compensate for changes in the constellation including the changing of capacities and shut of cross-plane cross-links.

Figure 6:
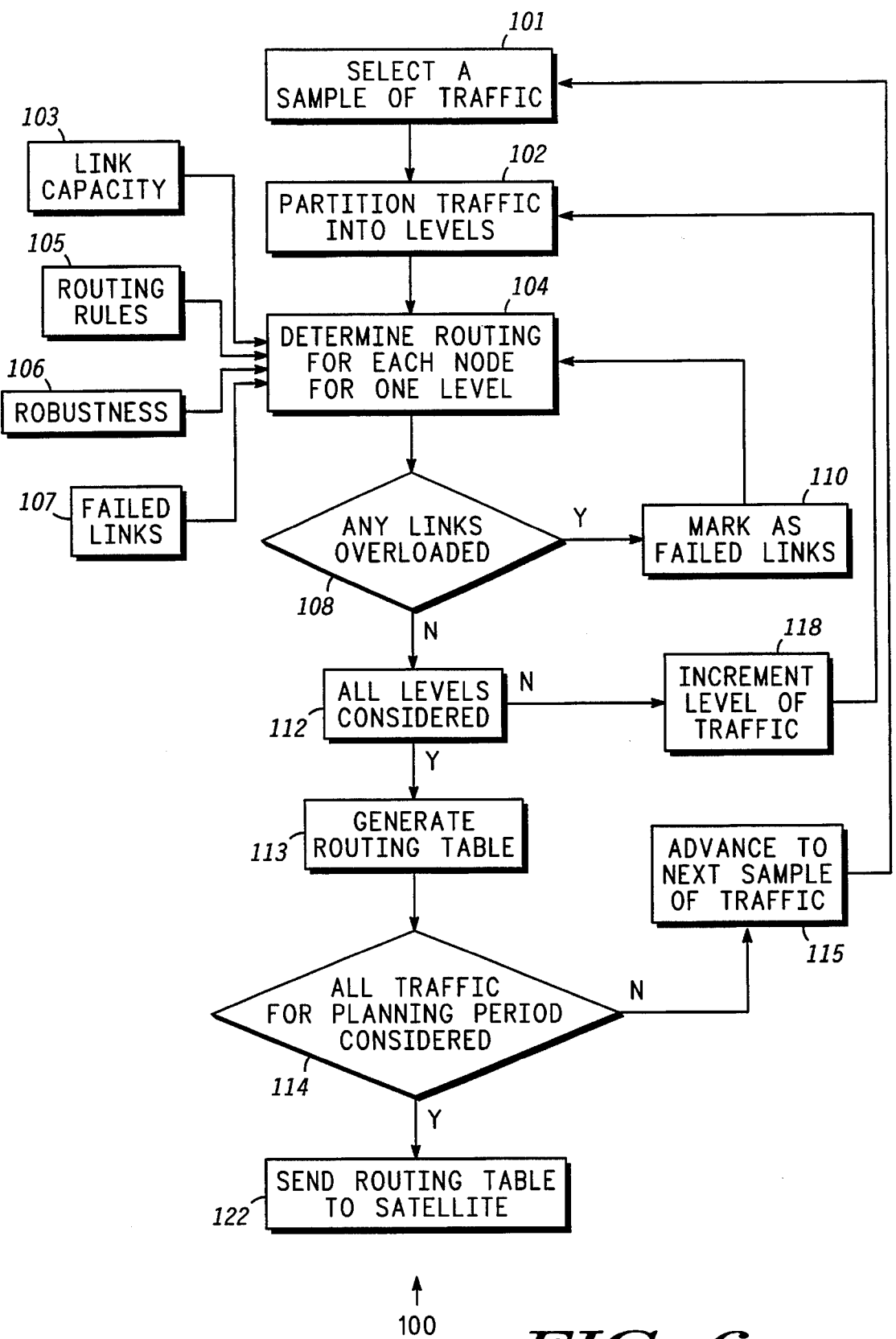
FIG. 6 shows an example of a procedure used to construct routing tables suitable for use in a preferred embodiment of the present invention.

FIG. 6 shows an example of procedure 100 used to construct routing tables suitable for use in a preferred embodiment of the present invention. The routing tables generated by procedure 100 provide instructions for each of the nodes in a network of nodes (i.e., satellites 12 of system 10, FIG. 1). The routing tables further provide routing instructions where the nodes are moving with respect to each other and the traffic carrying capacity of the cross-links vary with time and position of the nodes.

Task 101 selects successive incremental samples of communication traffic considered during a planning interval. A planning interval is a predetermined period of time for which traffic samples are selected. Traffic samples may be determined by actual measurements of communication traffic or predicted communication traffic may be used. On the first time through, task 101 selects a traffic sample for the first planning interval of an entire planning period for which a routing table may be generated.

Task 102 partitions the anticipated traffic, or a sample surrogate, which will be conveyed over the network during the planning interval. The input traffic is separated into a set of levels or strata. Each of these levels is preferably a simple subset of the entire traffic which would eventually be routed across a communication network following the instructions which are created by the remainder of procedure 100. Procedure 100 generates routing tables which include instructions to be followed at the nodes of the communication system. This traffic, or sample surrogate, is the traffic which will be handled by the network for each of a number of short time periods referred to as planning intervals. The sum of the planning intervals is herein referred to as a planning period. For example, in a preferred embodiment, input traffic may be divided into eight levels or strata, at each of the planning intervals of the planning period.

The planning period is desirably between 18 around 36 hours, and preferably about 24 hours. A planning interval, at which the routing is examined, is desirably between fifteen seconds and one minute, and preferably around 30 seconds. The first strata or level partition of traffic for the first planning interval exits task 102 and is input into task 104. The final portion of procedure 100 describes how each of the levels of traffic is examined for each of the planning intervals for an entire planning period.

Task 104 translates the input traffic sample into a set of routing instructions which are then recorded for later transmission to the nodes of the network. The traffic sample contains an amount of traffic for which routes are to be determined between a source and destination. Determination of these routes includes the selection of instructions to be retained by each node so that as data packets arrive with a destination indicated, real-time decisions can be rapidly and easily made to send the packet on a next link towards the data packet's destination. Numerous techniques exist for relating network node connectivity to routes between a source and destination. Most all of these depend upon a set of constraints and a cost function which is either minimized or maximized. For example, the "Bellman-Ford" Algorithm may be used. This technique is discussed in "Data Networks", by Dimitri Bertsekas and Robert Gallager of Massachusetts Institute of Technology, 1987.

Task 104 of procedure 100 operates with whatever techniques are selected to determine the routing between nodes and therefore, the specific methodology used, is not critical to the invention. Procedure 100 develops of a set of routing instructions which are stored as table entries. The tables are placed at the nodes of a communication network and cause that node to continue to route traffic for a period of time into the future. Classical techniques such as Bellman Ford or any other similar strategy examine the network connectivity and then calculate a route which satisfies certain constraint criteria. As mentioned above, a cost function drives the process for the instant process. For the present invention, one routing criteria that may be selected is that a minimum number of links be used in the transmission of a data packet, or in other words is a minimum hop count route. When more than one minimum hop count route exists with the same minimum hop count, routing may be varied to use each of these equivalent routes, subject to other criteria discussed below. In this way, additional reliability and robustness is provided to the network to transient or permanent failures.

Task 103 provides a definition of the capacity of the communications links within the network. The capacity of each link is identified and expressed as a time function. The time function is preferably in a form that a routing determination method (e.g. Bellman Ford) is able to assess the capacity at the moment of calculating routing for each planning interval. The sum of the planning intervals comprise the planning period for which routing instructions are created for each of the nodes of the network. This is especially important within low earth orbit satellite systems since the capacity of the satellite to satellite cross-plane cross-links 23 (FIG. 1) may change as a function of the distance between the satellites. This is because cross-plane cross-links 23 (FIG. 1) couple satellites in adjacent orbital planes 14 (FIG. 1).

For pairs of satellites which are communicating using a cross-link with dynamic and variable capability to transfer communication packets, the routing determination process adjusts the routing in response to this variation. For example, procedure 100 generates a routing table for each planning interval. The routing table considers the capacity of the cross-plane cross-link during that planning interval. Failure to adjust to the variable capacity of a cross-link may result in attempts to transport more packets over the cross-link than there is capacity to sustain transmission through the cross-link. The adjustments to the routing process prevent offering more communication packets to a link than the link can transfer without loss and the attendant impairments to the fundamental service being provided. Such a condition might occur if the routed traffic load, expressed in packets, is permitted to approach the instantaneous packet capability of the link. For services such as voice communication, there are natural silence periods, which in general mean that the number of packets generated and flowing in the network are substantially less than if voice were a continuous generator of packets. This statistical nature of the density of voice packets permits the link and therefore the network capacity to be expressed as numbers larger than the packet capacity.

Task 106 accommodates both statistical bunching of packets and provides for a difference between predicated traffic used for planning purposes and real-time traffic which occurs during a period when routing instructions are in use. In one embodiment, a uniform robustness factor is used when the capacity of each link is calculated. For example, a single capacity amount of about 300 connections could be subtracted from each of the links. A resulting reduced capacity is used to determine the amount of traffic which is routed over each of the links. Statistical bunching of packets can occur when the silent periods in the connections currently transiting a link vanish simultaneously. This event presents a load to the link in excess of the average, and depending upon the current usage of the link, may result in loss or delay of some of the packets. Sufficient headroom or robustness to prevent more than infrequent occurrences is desirable to avoid degrading the quality of service offered by the network.

Task 107 enters the links and/or nodes which are known to be inoperable within the network. This is a factor in determining the instantaneous connectivity of the network. Other factor include the fundamental structure of interconnection using in-plane cross-links 21 (FIG. 1) and cross-plane cross-links 23 (FIG. 1) between satellites, and the instantaneous capacity of all links described in task 103. Inclusion of links and nodes which are inoperable or to be avoided for other network control and administration reasons, completes the full definition of the entire network instantaneous connectivity and link capability.

Task 105 permits a variety of rules to be introduced into the process of determining routing. As discussed in task 104, determining the route which transits the minimum number of links in spanning from source to destination of a connection is one example of a routing constraint. It is also desirable that separate routes of the same minimum number of hops shall also be used when possible. These equivalent routings are used for traffic presented by the second and subsequent levels or strata after the first traffic increment. As an example of how this might be applied, traffic from the first level of selection uses the first minimum number of links route identified. When the second level or strata of traffic is processed, if a different but equidistant minimum number of link route is available, (i.e., the same hop count) this different route is used for the traffic of the second level. In like fashion, if there are additional routes of the same number of links or hops, these other routes would be considered in the processing of the remaining levels or subsets of excitation planning traffic.

Task 104, in summary uses the link capacities captured as a function of time in task 103, the robustness parameters captured in task 106, the condition of the links and nodes of the network as captured in task 107, and the constraints of routing captured in task 105 together with an algorithmic methodology to determine the routing for a level or strata of traffic. If the level or strata of traffic, added to whatever traffic was previously routed through the same links, is able to route through the pattern identified in by the routing algorithm, the traffic activity associated with that traffic level is complete and routing instructions are determined and ready to be recorded.

Task 108 determines if actions within task 104 are complete and whether all of the constraints have been met simultaneously. Task 108 examines whether the sum of all the traffic routed on each of the links in the network is less than the capacity of each link. Task 108 may also examine whether the sum of all the traffic routed on each of the links in the network is less than a reduced capacity of each link. This reduced capacity, for example, may be determined by the combination of link capacity as determined by task 103 and robustness as determined in task 106. If the sum of routed traffic is less than the reduced capacity, none of the links are over utilized. In fact there may still be substantial capacity available that can be used to route an additional amount of traffic represented by the additional levels or strata which have not as yet been examined. If task 108 determines that the links are overloaded, task 110 is performed. If task 108 determines that the links are not overloaded, task 112 is performed.

When task 108 determines that the links are overloaded, one or more links in the network are beyond their reduced, but usable capacity. If this configuration for routing was recorded and used by a node, substantial numbers of the packets may not be able to transit successfully through the network. If there are links overloaded (i.e., beyond their reduced capacity, for example), task 108 performs two actions. First, the traffic for the level or strata under consideration is removed from each of the links that were determined to be in use. This returns the links to a state where none of them are beyond their usable capacity. Next those links which were driven beyond their reduced capacity by the level or strata of traffic, are identified. Task 110 marks these links as "failed" as far as subsequent routing for the traffic level under consideration is concerned. Marking overloaded links as failed has the effect of removing these links from further consideration for routing while permitting the use of a simple accounting change to the list of "failed" links identified in task 107. It is important to note at this point in the procedure that no routing has been determined for the level or strata of traffic which caused links to be identified for use beyond their usable capacity (i.e., overloaded). Since this leaves a portion of the traffic unprocessed, task 104 is re-executed for the same level or partition of traffic, but with the links marked as "failed" which based on the prior iteration, were overloaded.

If no links were identified in task 108 as overloaded or beyond reduced capacity, than a route has been found for all of the traffic within the level or strata under consideration. Task 112 determines whether all of the levels of striation have been considered. If the entry into this task was not for the last level, then task 118 increments the level number by one and returns to task 102 for selection of the next level or strata of traffic. If all of the levels have been considered (for example, if traffic were partitioned into eight levels or strata and the last action was for level eight), then the routing has been determined and eight sets of routing instructions for each node in the network has been generated. These sets of routing instructions will apply to the particular planning interval for which the sample of traffic was selected in task 101. Sets of routing instruction also need to be generated for each planning interval.

Task 113 stores the sets of routing instructions for each of the nodes for the planning interval. This amounts to routing tables for each node considered, each of which, for example, has one page or portion corresponding to one level of partitioned traffic. In the preferred embodiment where traffic is partitioned into eight levels, a routing table would have eight pages or portions.

Task 114 then determines if all of the traffic samples from each planning interval for the entire planning period under consideration has been used to develop corresponding routing tables. If so then routing tables for a full planning period's worth of routing have been created (for example, for a twenty-four hour period). The routing tables are delivered to the appropriate satellite node by task 122. If all planning intervals of the planning period have not been considered, task 115 increments the planning interval by one, and procedure 100 proceeds to task 101 to select a sample of traffic for that next planning interval. Tasks 102 through 114 are repeated for the traffic samples for the next planning intervals until all traffic samples for the planning period have been processed.

FIG. 7 shows a representation of a routing table suitable for use in a preferred embodiment of the present invention. Routing table 200 is shown as having eight pages or portions 204, one for each traffic level. More or less pages or portions may be used depending on the desired number of traffic levels. A table similar in logical content to table 200 would desirably exist in each of the nodes of the network. Destination IDs 202, similar to destination routing code 74 (FIG. 2) are assigned for each of the nodes in the network, including satellites 12 and Earth Terminals (ETs) 24 associated with Gateways (GW) 22 and System Control Segment (SCS) 28. For convenience of explanation, ETs receive a designators rather than a GW or SCS. In a preferred embodiment of the present invention, 255 destination IDs are used. There is a selection of one made for each active satellite in the constellation and one each for active ETs. These designators or destination IDs can be throughout of as the numbers of the rows of a matrix which will contain routing instructions for the node.

The columns of the matrix are the levels used in the partitioning of the traffic projections. As shown in the example of table 200, there are eight columns or pages 204 of instructions, one for each level of traffic. The intersection of a row and column is filled with routing instructions 206 (i.e., an exit link) that direct the packet based on a destination routing code 74 (FIG. 2) corresponding to the row destination. The instruction contained in the table entry 206 is desirably a designator for one of several possible exit links from the satellite. For example, in one embodiment, table entry 206 may contain an "F" which designates the cross-link which is forward (i.e., in the direction of flight of the satellite). In this embodiment, table entry 206 may alternatively contain an "A" which designates the cross-link which is to the aft or rear (i.e., opposite the direction of flight of the satellite). In this embodiment, table entry 206 may alternatively contain an "R" which designates the cross-link which to the right, or an "L" which designates the left link (as viewed facing in the direction of flight. In this embodiment, table entry 206 may alternatively contain an "GW1", "GW2", "GW3", or "GW4" which designates one of four gateway antenna subsystems that connect the satellite with the terrestrial facilities (i.e., ET 25, FIG. 1) using earth link 15, for example.

Figure 8:
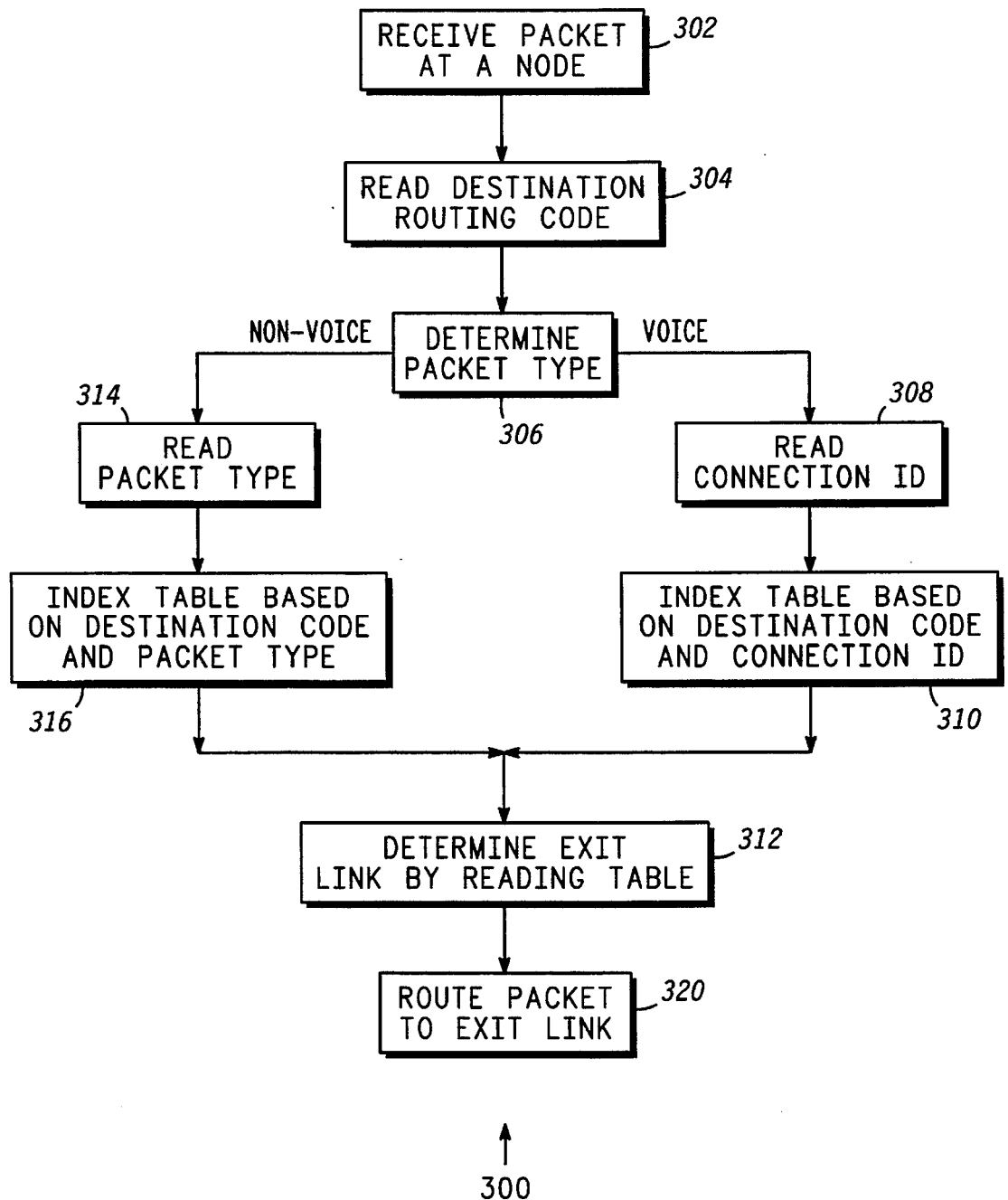
FIG. 8 shows an example of a procedure for routing data packets suitable for use in a preferred embodiment of the present invention.

FIG. 8 shows an example of procedure 300 for routing data packets suitable for use in a preferred embodiment of the present invention. Procedure 300 desirably uses a table similar to Table 200 (FIG. 7) contained in each of the nodes and generated by procedure 100 (FIG. 6). Task 302 receives a data packets within a node. The data packet is examined by the receiving node in parts. The destination routing code 74 (FIG. 2) is read by task 304. The destination routing code points directly to one of the rows of the routing table. Next the packet type 72 (FIG. 2) is examined and a determination is made by task 306 whether the payload 78 (FIG. 2) of the data packet contains voice digits or is non-mission data such as telemetry or control. If the packet contains non-mission data, the specific type of packet is identified by task 314. Different types of non-mission data can then use one of the eight pages of the routing table. Nominally they are distributed across all of the eight possibilities. Task 316 examines the packet type and selects the specific page of the routing table to be used. Voice and user data packets exit task 306 and enter task 308 where the least significant bits of the connection ID 36 (FIG. 1) of a data packet are read. These bits via task 310 point to or index one of the eight pages of the routing table. Since connection IDs are desirably assigned from lists maintained at the nodes and ETs 24 (FIG. 1), the connection IDs exhibit a random or nearly random distribution. Because of this at least nearly random distribution, the page of the routing table selected for a specific destination will be randomly distributed across the eight pages of the routing table resulting in a division of load between alternative routes of a source and destination. Task 312 uses the pointer from either task 310 or 316 to determine the column (or page) of the routing table. The entry found at that intersection point is the exit routing instruction 206 (i.e., exit link designator) which determines the direction that the data packet takes to exit the node. Task 320 completes the routing of the data packet within a node by transferring the data packet to a position specified by the exit routing instruction 206.

Note that in procedure 300, none of the payload of the data packet is examined. Because of this, fewer decisions are required and most of the selections can be done by indexing or pointing, thereby significantly improving the speed of operation and reducing the processing required. Furthermore, there is no visibility into the packet payload and hence only the lowest physical layer of information is available to the routing process. This simplifies the routing process with no loss of generality in the movement of packets to their desired destination.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provides an improved method and apparatus of routing data packets among nodes in a communication system where the connections or links between the nodes are changing as a function of the position of the node. These advantages include a highly distributed routing method that is amenable to computation at a central control location with routing instructions distributed periodically to all of the nodes in the network or via exchange of information between the nodes. Autonomous, interrelated routing tables are constructed at each of the nodes based upon the information received. The complexities and risk associated with autonomous computation at each node is avoided, while the benefits of more rapid adjustments are maintained. Another advantage of the routing method is that approximate uniformity of usage of alternative network links is achieved while simultaneously limiting the number of hops on each path used for routing. Another advantage of the present invention is that the routing method achieves throttling which limits any propensity for link congestion which can exist if the routing instructions are not carefully constructed.

The routing method furthermore accomplishes a number of missions substantially simultaneously. For example, traffic load has been shared between equivalent routes (i.e., the same minimum hop count) through the network. An indexing structure (i.e., routing tables) has been created which permit very rapid routing decisions to be made at each of the nodes of the communication system. Furthermore, tolerance to random variations in instantaneous number of packets present at any time has been incorporated by not attempting to use the links to their absolute capacity where loss of data packets may occur when minor instabilities in traffic flow were experienced. Additionally, the routing method takes into account a tolerance to errors inherent in predicting the volume of traffic for future times based on history, known conditions, and estimates of future traffic. Additionally, as large a volume of traffic as possible is routed, according to the constraints employed, along the path which transits the absolute minimum number of links in the network. Where it is impossible to route all of the traffic along a path of minimum number of links, the minimum additional number of links is used to route. A simple and natural means is available to describe the failure state of the network and to then re-calculate routing when new failures in links or nodes do occur.

What is claimed is:

1. In a communication system comprised of nodes that communicate with each other over links, a method of routing data packets among said nodes comprising the steps of:

(a) partitioning an anticipated system traffic load into traffic levels, each traffic level being a subset of said anticipated system traffic load;

(b) providing an initial routing instruction set for each node;

(c) performing a routing simulation using said initial routing instruction set and traffic loading of said one traffic level;

(d) finding overloaded links by comparing a link capacity of each of said links with a utilized capacity of each of said links during said routing simulation;

(e) performing a second routing simulation using traffic loading of said one traffic level excluding links determined to be overloaded from step (d);

(f) generating a new routing instruction set based on said second routing simulation, said links determined to be overloaded being excluded from said new routing instruction set; and (g) routing said data packets away from one of said nodes according to said new routing instruction set.

2. A method as claimed in claim 1 further comprising the step of repeating steps (d) and (e) until no links are found to be overloaded.

3. A method as claimed in claim 2 further comprising the step of repeating steps (b) through (f) for each of said traffic levels.

4. A method as claimed in claim 3 wherein step (f) further comprises the step of generating a routing table for each of said nodes, said routing table comprising said new routing instruction set for each of said traffic levels.

5. A method as claimed in claim 1 wherein step (b) further comprises the step of determining minimum hop routes between source and destination pairs of said nodes, 6. A method as claimed in claim 5 wherein step (d) further comprises the step of marking said overloaded links as failed links, and wherein said determining step comprises the step of determining said minimum hop routes without considering said links marked as failed links.

7. In a communication system comprised of nodes that communicate with each other over links, a method of routing data packets among said nodes comprising the steps of:

(a) predicting an actual traffic load during a planning interval to determine an anticipated system traffic load during said planning interval, said planning interval being a predetermined period of time;

(b) partitioning said anticipated system traffic load into traffic levels, each traffic level being a subset of said anticipated system traffic load;

(c) providing a routing instruction set for each node for one of said traffic levels;

(d) performing a routing simulation using said initial routing instruction set and traffic loading of said one traffic level;

(e) finding overloaded links by comparing a link capacity of each of said links with a utilized capacity of each of said links during said routing simulation;

(f) performing a second routing simulation using traffic loading of said one traffic level excluding links determined to be overloaded from step (d);

(g) generating a new routing instruction set based on said second routing simulation, said links determined to be overloaded being excluded from said new routing instruction set;

(h) repeating steps (e) through (g) until no links are overloaded;

(i) repeating steps (c) through (h) for each of said traffic levels;

(j) repeating steps (a) through (i) for subsequent planning intervals; and (k) generating a routing table for each of said nodes, said routing table comprising said new routing instruction set for each of said traffic levels (l) routing said data packets away from one of said nodes according to said routing table for said one node.

8. A method as claimed in claim 7 wherein said predicting step includes the step of sampling an actual traffic load during said planning interval to determine said anticipated system traffic load for said planning interval.

9. A method as claimed in claim 7 wherein step (k) includes the step of repeating steps (a) through (j) for said subsequent planning intervals, each planning interval being between fifteen seconds and one minute, and wherein said subsequent planning intervals comprise a planning period, said planning period being approximately twenty-four hours.

10. A method as claimed in claim 7 further comprising the step of sending said routing table for each of said nodes to each of said nodes.

11. A method as claimed in claim 7 wherein each of said data packets include a destination routing code that indicates a destination node for each of said data packets, said method further comprising the step of receiving one of said data packets at said one of said nodes, and the step of routing said data packets comprises the steps of:

reading said destination routing code from said one data packet;

reading a connection identification (ID) from said one data packet;

indexing said routing table based on said connection ID and said destination routing code; and determining an exit link of said one node by reading said routing table.

12. A method as claimed in claim 11 wherein said connection ID includes least significant bits (LSB), and wherein the reading said connection ID step includes the step of reading said LSBs of said connection ID, and wherein the indexing step includes the step of pointing to one of several portions of said routing table based on said LSB, each portion of said routing table being associated with one of said traffic layers.

13. A method as claimed in claim 11 further comprising the step of determining a packet type from said one data packet, and wherein said indexing step further comprises the step of indexing one of said routing tables based on said packet type when said packet type indicates that said one data packet contains non-voice data.

14. In a communication system comprised of nodes that communicate with each other over links, a method of routing data packets among said nodes wherein said data packets include a destination routing code, the method comprising the steps of:

(a) partitioning an anticipated system traffic load into traffic levels, each traffic level being a subset of said anticipated system traffic load;

(b) providing a routing instruction set for each node for one of said traffic levels;

(c) performing a routing simulation using said routing instruction set and traffic loading of said one traffic level;

(d) finding overloaded links by comparing a link capacity of each of said links with a utilized capacity of each of said links during said routing simulation;

(e) performing a second routing simulation using traffic loading of said one traffic level excluding links determined to be overloaded from step (d);

(f) generating a new routing instruction set based on said second routing simulation, said links determined to be overloaded being excluded from said new routing instruction set, said new routing instruction set associating said destination routing code with an exit link of each of said nodes; and (g) routing said data packets away from one of said nodes according to said new routing instruction set.

15. A method as claimed in claim 14 wherein step (f) further comprises the step of generating said new routing instruction set using a robustness criteria for each of said links, said robustness criteria including a reduced link capacity.

16. A method as claimed in claim 15 wherein said robustness criteria is a predetermined percentage of said link capacity associated with each of said links, and wherein step (f) further comprises the step of generating said new routing instruction set based on said predetermined percentage of said link capacity.

17. A method as claimed in claim 15 wherein said nodes are satellites that move with respect to each other, said satellites moving in an associated orbital plane, and wherein at least some of said links are cross-links coupling said nodes located in adjacent orbital planes, and wherein said link capacity of said cross-links varies as a function of an orbital position of each of said satellites within said associated orbital plane, and wherein step (f) further comprises the step of generating said new routing instruction set considering said link capacity of said cross-links for a planning interval associated with said orbital position of each of said satellites, said planning interval being a predetermined period of time.

18. A method as claimed in claim 17 wherein some of said cross-links are shut off as said satellites change said orbital position, wherein:

step (d) further comprises the step of marking said crosslinks that are shut off as failed links, and step (e) further comprises the step of performing said second routing simulation without considering said failed links, and step (f) further comprises the step of generating a routing table for each of said nodes, said routing table comprising said new routing instruction set for each of said traffic levels, said routing table not including any of said failed links.

19. A method as claimed in claim 15 wherein step (d) further comprises the step of determining whether any of said links that will be overloaded by comparing a used capacity of each link with an available capacity of each link, said used capacity based on said routing instruction set, said available capacity based on said robustness criteria for each of said links.

20. A method of routing a data packet among nodes in a constellation of nodes coupled by links, said nodes being part of a communication system wherein said data packet includes a destination routing code that indicates a destination node for said data packet, said method comprising the steps of:

receiving said data packet at one of said nodes;

reading said destination routing code from said data packet;

reading a connection identification (ID) from said data packet;

reading least significant bits (LSB) from said connection ID;

indexing a routing table stored in said one of said nodes based on said connection ID and said destination routing code;

determining an exit link of said one node by reading said routing table; and routing said data packet away from said one node over said exit link, and wherein said routing table being generated by the steps of:

partitioning an anticipated system traffic load of said communication system into traffic levels, each traffic level being a subset of said anticipated system traffic load;

generating an initial routing instruction set for each node for one of said traffic levels;

determining if any of said links will be overloaded based on said initial routing instruction set;

re-generating, when said any of said links are determined to be overloaded, said routing instruction set for each node by excluding said links determined to be overloaded;

repeating the re-generating and determining steps until no links are determined to be overloaded;

repeating the generating step, the determining step and the re-generating step for each of said traffic levels; and generating said routing table for each of said nodes, said routing table comprising said routing instruction set for each of said traffic levels, and wherein said indexing step includes the step of pointing to one of several portions of said routing table based on said LSB, each portion of said routing table being associated with one of said traffic levels.

21. A method of recursively determining routing for data packets in a communication system comprised of nodes connected by links, said method comprising the steps of:

(a) partitioning an anticipated system traffic load into traffic levels, each traffic level being a subset of said anticipated system traffic load;

(b) generating an initial routing instruction set for each node for one of said traffic levels;

(c) determining if any of said links will be overloaded based on said initial routing instruction set;

(d) re-generating, when said any of said links are determined to be overloaded, said routing instruction set for each node by excluding said links determined to be overloaded (e) repeating the re-generating and determining steps until no links are determined to be overloaded;

(f) repeating steps (b), (c) and (d) for each of said traffic levels;

(g) generating a routing table for each of said nodes, said routing table comprising said routing instruction set for each of said traffic levels; and (h) sending said routing table for each of said nodes to said each node wherein said step (a) partitions said anticipated system traffic load into traffic levels for each of a plurality of planning interval, said planning intervals, each planning interval being a predetermined period of time, said plurality of planning intervals comprising a planning period, and wherein said method further comprises the step of repeating steps a through g for each of said planning intervals in a planning period, said planning interval being between fifteen seconds and one minute, said planning period being approximately twenty-four hours.

22. A communication system that routes a data packet comprising:

a plurality of nodes that move with respect to each other, said nodes coupled by communication links;

transceivers associated with each node of said plurality of said nodes for routing said data packet over said communication links;

a memory for storing a routing table;

a first processor for generating said routing table; and a second processor for reading said routing table and instructing said transceivers to send said data packet away from one of said nodes based on said routing table, and said first processor comprising:

means for partitioning an anticipated system traffic load into traffic levels, each traffic level being a subset of said anticipated system traffic load;

means for generating a routing instruction set for said one of said nodes for said traffic levels;

means for determining if any of said communication links will be overloaded based on said routing instruction set; and means for re-generating, when said any of said communication links are determined to be overloaded, said routing instruction set for said one of said nodes by excluding said communication links determined to be overloaded.

* * * * *